Patented June 11, 1929.

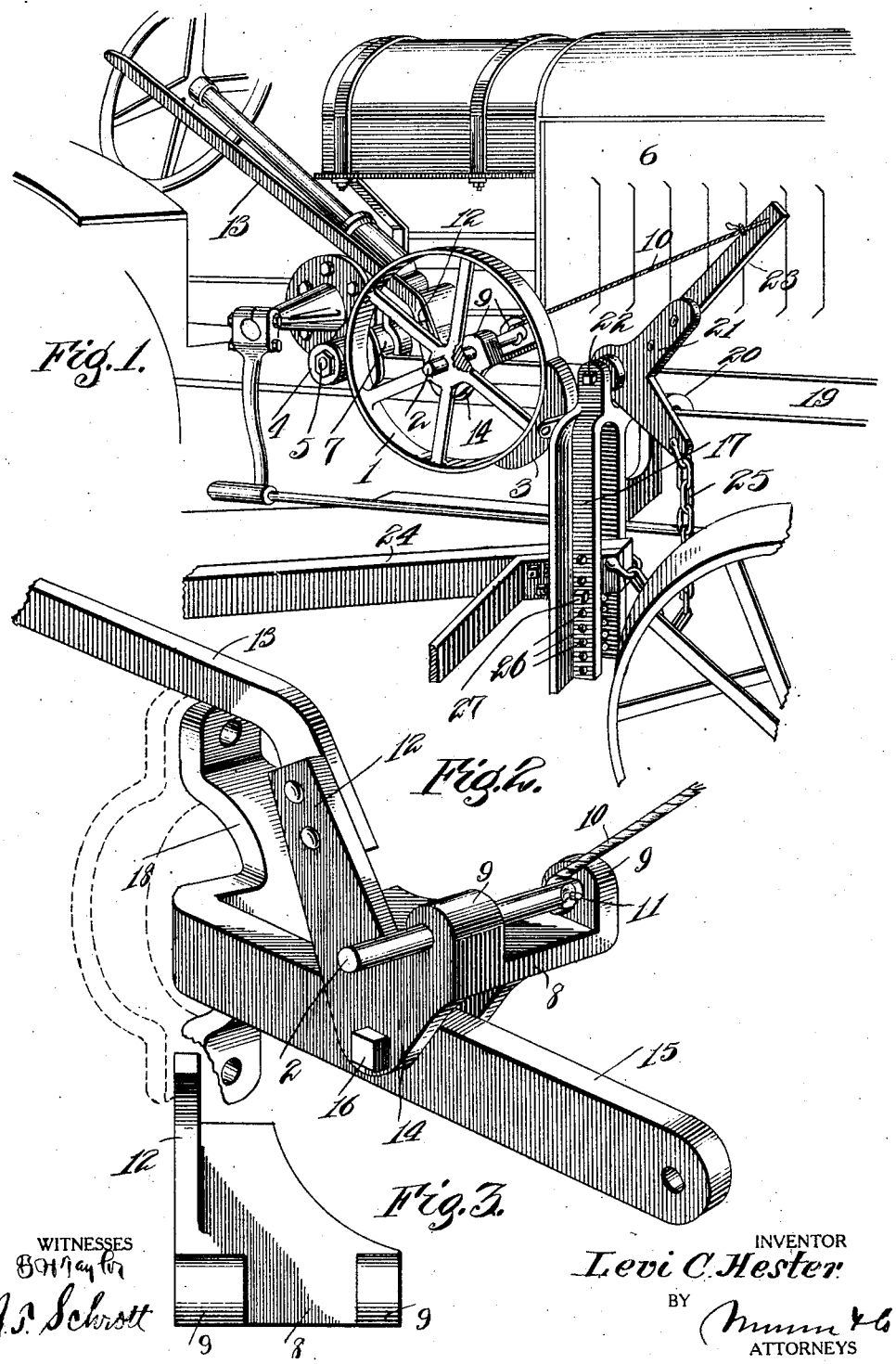

1,717,209

UNITED STATES PATENT OFFICE.

LEVI CUMMINGS HESTER, OF JACKSONVILLE, FLORIDA.

POWER LIFT FOR TRACTOR PLOWS.

Application filed March 14, 1927. Serial No. 175,319.

This invention relates to improvements in plows, but more particularly to plows such as are used in connection with and driven by tractors, and it consists of the constructions, combinations and arrangements herein described and claimed.

An object of the invention is the provision of an arrangement for utilizing part of the power of the tractor engine in lifting a plow carried and driven by the tractor from the operative or working position to an inoperative or suspended position upon the tractor frame.

Other objects and advantages appear in the following specification reference being had to the accompanying drawings, in which:—

Figure 1 is a perspective view of part of a tractor showing the power lift applied, Figure 2 is a detail perspective view of the pivot joint or bracket.

Figure 3 is a detail plan view of the pivot joint or bracket.

As already indicated in the foregoing brief statement of the object of the invention it is the purpose of the present improvement to make possible the lifting of a plow or plows particularly as carried and driven by tractors through the motive power of the tractor from a lowered or operative position to a raised or inoperative position, thus obviating the manual effort necessarily exerted under other circumstances to accomplish the same purpose. Frequently there is more than one plow on a beam thus making the beam quite heavy and necessitating the exercising of considerable effort on the part of the driver in lifting the beam from the ground. The improvement provides a support employing part of the power of the tractor engine to accomplish the desired purpose, the necessary structure not only being very simple but most efficient and easily operated.

Reference is made to the drawings. A bull wheel 1, fixed upon one end of a revoluble shaft 2, is ordinarily in engagement with a relatively stationary wooden brake shoe 3 which keeps it from turning, but may be brought into engagement with a friction wheel 4 on the power shaft 5 so that turning of the shaft 2 may ensue. The power shaft 5 must be regarded as a driven part of the tractor engine which the reader may suppose to be located under the hood 6. The power shaft housing is indicated at 7.

The mounting for the bull wheel shaft 2 comprises what is herein known as the pivot joint or bracket 8 (Fig. 2). This bracket includes upstanding bearings 9 in which the shaft 2 is journaled. These bearings are spaced apart, and that portion of the shaft 2 between the bearings serves the purpose of a drum upon which the lifting cable 10 is wound when the bull wheel is drawn into contact with the friction wheel 4. The end of the cable 10 is attached to the shaft 2 in any suitable manner, a stud 11 being indicated for the purpose of illustration. An arm 12 provides a place for the attachment of the control or operating lever 13. A pair of flanges 14 straddle the supporting bar 15, and receive a bolt 16 by which the joint or bracket 8 acquires its pivotal mounting. Operation of the lever 13 causes rocking of the mounting 8 and shifting of the bull wheel.

The forward end of the supporting bar 15 is securely fastened to the plow beam guide 17 while the rear end is securely fastened to the power shaft housing 7 for which purpose the rear end of the bar terminates in a curved formation 18 permitting ready application to the housing and easy attachment to a similarly formed means applied to the opposite side of the housing and constituting a flange. The beam guide 17 is attached to the tractor housing frame 19 by means of a hanger 20 projecting over the housing frame as shown. A bell crank 21, pivoted upon the guide 17 as at 22 has an extension 23 to which the lifting cable 10, previously described, is attached. The remaining arm of the bell crank has connection with the plow beam 24 by means of a chain 25 or other flexible element. The guide 17 has a plurality of bolt holes 26 in the bottom end for the purpose of receiving the bolts 27 and providing a positive depth gauge for the plow or plows (not shown). The guide 17 is relatively stationary and the end of the plow beam 24 rests upon the bolt 27 when in the operative position.

The operation is readily understood. Assume that the plow beam 24 is in the lower or operative position. The bull wheel 1 rests in engagement with the relatively stationary brake shoe 3 in which position it is held by gravity by virtue of the fact that the shaft 2 occupies a position at one side of the pivot point 16. The bell crank 21 also tends to turn over to the right with the plow beam 24 lowered and by virtue of pulling upon the cable 10 assists in drawing the bull wheel in the direction of the brake shoe 3. The bull wheel is thus held from turning.

Assuming next that the operator desires to lift the plow beam 24 it now becomes necessary to bear down on the lever 13 and thus rock the joint or bracket 8 upon its pivot 16 and move the bull wheel 1 over until it contacts with the friction wheel 4. Presuming the power shaft 5 to be revolving it is seen at once that the bull wheel 1 and stud shaft 2 will commence turning so that the cable 10 is wound up upon the drum portion of the shaft 2 causing rocking of the bell crank 21 and lifting of the front end of the plow beam 24 through the flexible element 25. It thus becomes apparent that the exertion of the operator is confined to the depression of the lever 13 the power required for the lifting of the plow beam 24 and the weight imposed thereupon being furnished by the shaft 5 and friction wheel 4 of the tractor. Upon desiring to again lower the plow beam the operator has only to let up on the lever 13 when by careful manipulation of the lever and consequent easing off of the bull wheel against the brake shoe 3, the plow beam can be lowered as speedily as desired until the shaft 2 passes the vertical center of the pivot 16 when the bull wheel 1 is finally held in frictional engagement with the brake shoe so that no further turning of the shaft 2 can occur.

While the construction and arrangement of the improved power lift is that of a generally preferred form, obviously modifications and changes may be made without departing from the spirit of the invention or the scope of the claims.

I claim:—

1. A tractor-mounted ground working implement embodying a tractor frame, an implement beam, a hanger attached to and depending from the tractor frame and adjustably supporting the front end of said beam, a shaft powered from the tractor motor having a drive wheel thereon, a brake carried by the tractor frame in determinately spaced relation to and alinement with said drive wheel, a hoist support pivotally mounted on said frame between drive wheel and brake for swinging movement toward and from said wheel and brake, said support having a drum shaft mounted thereon carrying a revoluble wheel in alinement with drive wheel and brake with said revoluble wheel and drum shaft offset from the support pivot in a direction normally by gravity to swing said support to move its revoluble wheel into contact with said brake, manually operable means cooperating with said support and effective to swing said support toward the drive wheel to engage its wheel therewith to revolve its drum shaft thereby, and means including a cable connected to the drum shaft and having operative connection with the implement beam, for lifting said beam through said power revolution of the drum shaft.

2. A tractor mounted ground-working implement including a tractor frame, a plow beam and a power shaft having a drive wheel; in combination, a brake fixed upon the frame, a hoist including a rotatable member which is mounted to rock between the brake and said drive wheel, means connecting the hoist with the plow beam including a cable joined with the hoist and beam-connected lifting and lowering elements interconnecting said cable and beam, said connecting element being arranged to rock the hoist by gravity into frictional engagement with the brake when the beam is in lowered ground-working position, and means for reversely rocking the hoist to bring the revoluble member of said hoist into contact with the said drive wheel causing revolution of said member and winding up of the cable thus moving the implement beam to another position through said connecting means.

3. A tractor mounted ground-working implement including a tractor frame, an implement beam and a shaft powered through the tractor motor having a drive wheel; in combination, a brake shoe mounted upon the tractor frame, a hoist occupying a position between the brake shoe and drive wheel, a mounting which is mounted upon the frame for rocking movement toward and from said drive wheel and brake and upon which the hoist is journaled, means connecting the hoist with the implement beam, said means including a cable, said hoisting means being positioned on its mounting to tend normally to rock the mounting in a direction to hold the hoist against the brake shoe, and manually operable means for rocking the mounting in another direction to move the hoist away from the brake shoe and into contact with the drive wheel for winding up the cable and raising the beam.

4. A tractor mounted ground-working implement including a tractor frame, an implement beam and a power shaft coupled to the tractor motor and having a drive wheel; in combination, a brake shoe mounted on the tractor frame, a hoisting device located between the brake shoe and drive wheel comprising a wheel and a drum shaft, a mounting upon which the drum shaft is journaled, means by which the mounting is pivotally supported off center, permitting gravitation of the mounting to move the hoist wheel against the brake shoe, means connecting the hoist with the implement beam, said means including a cable connected with the drum shaft, and means attached to the mounting for rocking it upon its pivot and shifting the hoisting device in the direction of the power shaft and bringing the hoist wheel into contact with the drive wheel for turning of the drum-shaft and the winding up of the cable to lift the implement beam through said connecting means.

5. A power lift for tractor mounted ground-working implement including a tractor frame provided with a mounting having spaced bearings, means by which said mounting is pivotally supported upon part of a tractor at a point to one side of said bearings, a tractor power shaft having a drive wheel thereon adjacent to said bearings, a shaft journaled in said bearings and carrying a bull wheel, that portion of the shaft between the bearings serving as a drum, means connecting the shaft with an implement beam including a cable attached to the drum-portion of the shaft, a brake carried by the tractor frame against which the bull wheel is gravitationally held by virtue of the disposal of said pivot and the tendency of the connecting means to move the mounting upon said pivot to one side, and means attached to the mounting for rocking the mounting upon its pivot to move the bull wheel into contact with the drive wheel and away from the brake causing turning of the shaft and winding up of the cable upon the drum-portion of the shaft for lifting the implement beam through said connecting means.

6. A tractor mounted agricultural implement including a tractor frame, a power shaft with a drive wheel, a housing for the power shaft, an implement beam, a beam guide and a bell crank mounted upon the beam guide and having connection with the beam; in combination, a power lift for the implement beam comprising a mounting carrying a hoisting device consisting of a shaft and a bull wheel, a bar secured at its respective ends upon the housing and upon the beam guide, means by which the mounting is rockably attached to said bar, a flexible element joining the shaft with the bell crank, a brake shoe carried by the tractor frame against which the bull wheel is frictionally held by the action of gravity and by a pull on the flexible element exerted through the bell crank, and a lever attached to the mounting for rocking it upon its pivot to move the bull wheel away from the brake shoe into contact with the drive wheel for the turning of the shaft and winding up thereon of the cable to raise the beam.

7. Apparatus of the character described embodying a tractor with a projecting power shaft with drive wheel thereon, a brake mounted in fixed position on said frame in alinement with and spaced from said drive wheel, a hoist mounted on the tractor in juxtaposition to the drive wheel between the latter and said brake and including a support rockable on said frame and mounting a drum shaft and a wheel thereon alined with said drive wheel and brake, said support being movable toward and from said drive wheel and brake with means normally tending by gravity to swing said support to hold the drum wheel out of engagement with the drive wheel and in engagement with said brake, an operating member for moving the drum wheel into rotative engagement with the drive wheel, a hanger attached to and depending from the tractor frame movably mounting the beam of an agricultural implement, and means connecting the drum shaft with said beam including a cable connected to said shaft effective to raise said beam when the shaft is rotated by the drive wheel.

LEVI CUMMINGS HESTER.